(12) United States Patent
Abichandani et al.

(10) Patent No.: US 8,326,267 B2
(45) Date of Patent: Dec. 4, 2012

(54) APPLICATION ACCESS CONTROL IN A MOBILE ENVIRONMENT

(75) Inventors: Jaideep Abichandani, Carol Stream, IL (US); Narayanan Haran, Hoffman Estates, IL (US); John Poplett, River Forest, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 783 days.

(21) Appl. No.: 11/617,561

(22) Filed: Dec. 28, 2006

(65) Prior Publication Data

US 2008/0160958 A1   Jul. 3, 2008

(51) Int. Cl.
*H04M 1/66* (2006.01)

(52) U.S. Cl. ............... 455/411; 455/418; 455/414.1; 455/432.1; 455/432.3; 455/434

(58) Field of Classification Search .... 455/432.1–435.3, 455/418, 414.1, 434, 432.3; 370/338, 392, 370/401
See application file for complete search history.

(56) References Cited

U.S. PATENT DOCUMENTS

| | | | |
|---|---|---|---|
| 6,925,087 B2 * | 8/2005 | Inoue | 370/401 |
| 2004/0246991 A1 * | 12/2004 | Tsuzuki et al. | 370/466 |
| 2005/0128956 A1 | 6/2005 | Hsu et al. | |
| 2005/0197924 A1 * | 9/2005 | Janakiraman et al. | 705/27 |
| 2008/0293413 A1 * | 11/2008 | Sharif-Ahmadi et al. | 455/435.1 |

OTHER PUBLICATIONS

Granstrom et al. "The Future of Communication Using SIP," *Ericsson Review* No. 1 (2002) (8 pages).
Gustafson, "Network Design with Mobile IP," Internet Society inet2001 Proceedings, obtained from the internet at http://ftp.isoc.org/inet2001/CD_proceedings/T40/inet_T40.htm on Dec. 4, 2006 (No specified date, but not later than applicant's filed) (23 pages).
Kavak, "Ericsson's Network-Based IP-VPN Solutions," *Ericsson Review* No. 3 (2000) (14 pages).
Kasargod et al. "Packet Data in the Ericsson CDMA2000 Radio Access Network," *Ericsson Review* No. 3 (2002) (8 pages).
Langer et al., "CDMA2000—A World View," *Ericsson Review* No. 3 (2001) (9 pages).
Gohring, "Nokia Simplifies Dual-Mode Phones," *IDG News Service* (Oct. 31, 2006), obtained from the Internet at http://www.pcworld.com/article/id,127713-page,1-c,cellphones/article.html on Nov. 9, 2006 (3 pages).

* cited by examiner

*Primary Examiner* — Kathy Wang-Hurst
(74) *Attorney, Agent, or Firm* — Leydig, Voit & Mayer, Ltd.

(57) ABSTRACT

A system and method are described whereby a mobile device controls access to mobile applications based on access conditions associated with a current access network. To prevent mobile applications from running when the access conditions are not suitable, the mobile device includes a policy database used to store a list of access conditions that are inappropriate for launching the installed applications. The access conditions are based on the type of the current access network used by the mobile device for launching or maintaining the requested application session. The access conditions indicate whether the mobile device is currently accessing its home network or roaming on another provider's network. Similarly, the access conditions indicate the type of network access interface used by the current network to provide the data connection necessary to run the requested application. The policy database correlates predetermined actions with the access conditions associated with a given application session.

20 Claims, 3 Drawing Sheets

APPLICATION ACCESS CONTROL IN A MOBILE ENVIRONMENT

FIELD OF THE INVENTION

This invention relates generally to the field of telecommunications and more specifically to the field of mobile telecommunications.

BACKGROUND OF THE INVENTION

With the transition to third generation wireless networks, a multitude of mobile applications extending the availability of Internet services to a mobile environment have become available. Wireless multimedia applications, in particular, are designed to bring the spectrum of entertainment and communications options previously available only via home or corporate networks to the wireless marketplace. Such applications and services are typically data-intensive and, therefore, are best suited to run on wireless networks capable of meeting the increased data requirements. Video streaming applications, for example, allow the wireless consumers to stream content from a remote server or a home computer to a mobile device and require wireless access networks with high data handling capabilities in order to meet the minimum Quality of Service (QoS) requirements and provide a satisfying user experience. While such high-speed data network standards as EVDO are designed to meet the needs of high bandwidth mobile multimedia applications, access networks operating in accordance with specifications having lower data handling capabilities may not be suitable for initiating data-intensive application sessions, especially in light of inherent mobility of wireless consumers. Given the abundance of multi-mode devices capable of accessing wireless networks that operate on different network standards, there are times when the requested application or service and the current access network are incompatible. Correspondingly, application requests launched on inappropriate access networks result in monopolization of available system resources by incompatible application sessions.

Another access network incompatibility scenario occurs when the mobile consumer is roaming outside of its home coverage area at the time when an over the air firmware update is taking place by invoking a firmware update application of the mobile device. In this case, the resulting firmware download results in unwanted roaming charges to the consumer.

BRIEF SUMMARY OF THE INVENTION

Embodiments of the invention are used to provide a system and method for controlling access to mobile applications from the mobile device based on access conditions associated with a current access network, To prevent one or more applications or services from running when the access conditions are not suitable, the memory of the mobile device includes a policy or application access database, which is used to store a list of access conditions that are inappropriate for launching the installed applications. In embodiments, the access conditions are based on the type of the current access network used by the mobile device for launching or maintaining the requested application session. For example, the access conditions may indicate whether the mobile device is currently accessing its home network or roaming on another provider's network. Similarly, the access conditions may indicate the type of network access interface used by the current network to provide the data connection necessary to run the requested application. The policy database correlates predetermined actions with current status of access conditions associated with a given application session. In one embodiment, when the mobile device accesses a network having an access technology specification with insufficient data handling capabilities for the requested application, the mobile device denies access to the data-intensive application or service specified in the policy database. Similarly, to avoid unwanted roaming charges, the mobile device's policy database includes instructions to suspend any scheduled firmware updates via a firmware over the air (FOTA) application until the mobile device returns to its home network.

In one aspect of the invention, a method is provided for controlling access to an application, the application capable of running on a mobile device by connecting to an access network, the method comprising registering the application with the mobile device, populating a record on the mobile device, the record specifying one or more conditions for controlling access to the application, the one or more conditions associated with the access network, monitoring the one or more conditions, and controlling access to the application from the mobile device based on the one or more conditions.

In another aspect of the invention, a mobile device is provided, the mobile device capable of running an application by connecting to an access network, the mobile device comprising a processor, a wireless interface for connecting to the access network, and a computer readable medium having thereon instructions for registering the application with the mobile device, populating a record on the mobile device, the record specifying one or more conditions for controlling access to the application, the one or more conditions associated with the access network, monitoring the one or more conditions, and controlling access to the application from the mobile device based on the one or more conditions.

In still another aspect of the invention, a system is provided for controlling access to an application, the application capable of running on a mobile device by connecting to an access network, the system comprising (a) the mobile device capable of storing a record for specifying one or more conditions for controlling access to the application, the one or more conditions associated with the access network, the mobile device comprising an access network monitor module configured to monitor the one or more conditions, and an application manager module configured to control access to the application from the mobile device based on the one or more conditions reported by the access network monitor module, and (b) a device management server having a management connection to the mobile device for populating the record.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
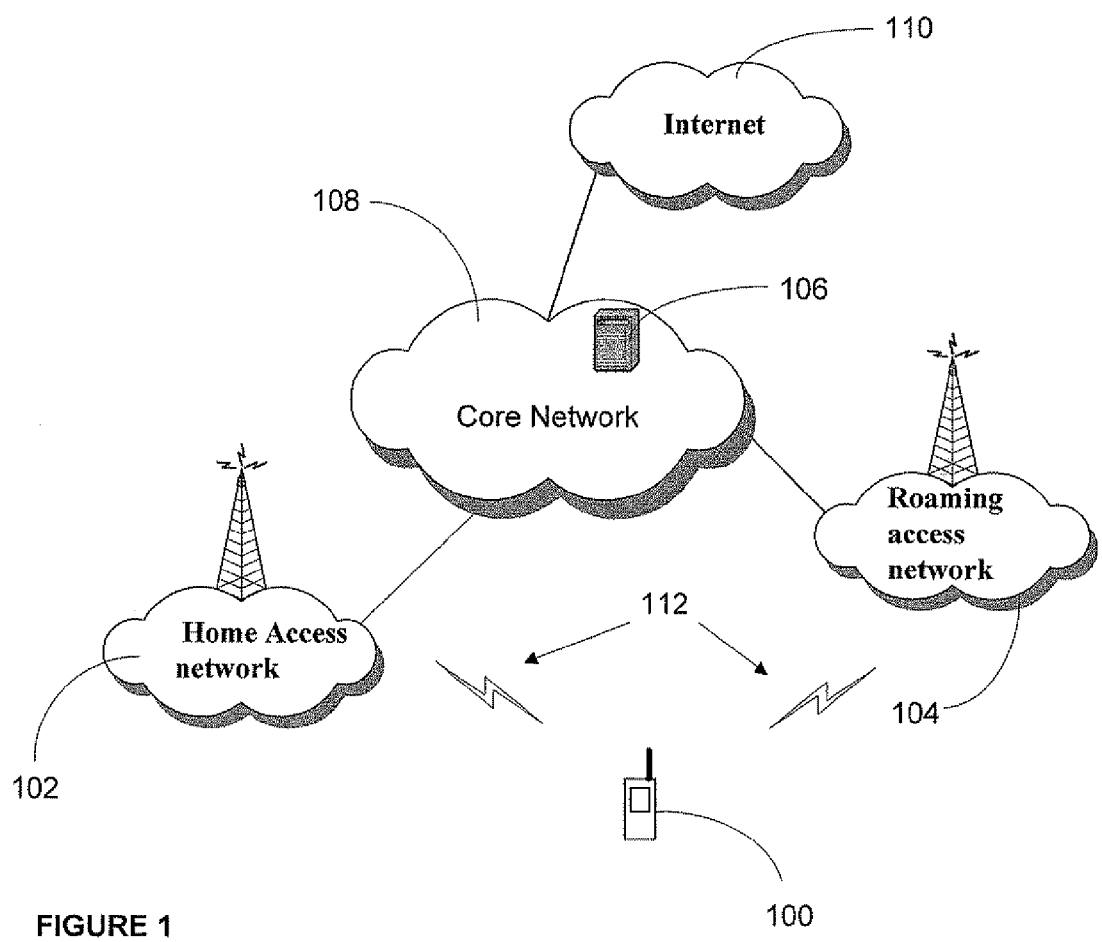
FIG. 1 is a schematic diagram illustrating a mobile network environment contemplated by an embodiment of the invention.

Turning to FIG. 1, an implementation of a system contemplated by an embodiment of the invention is shown with reference to a mobile network environment. In the illustrated embodiment, the user device 100 is a mobile device, such as a wireless telephone or a portable computer capable of launching an application by connecting to an application server 106 via one or more access networks 102, 104. The application server 106 is responsible for content delivery to the one or more applications running on a mobile device 100. For example, when the mobile device 100 includes a multimedia streaming application, the application server 106 employs a Real-Time Transfer Protocol (RTP) to stream the requested content to the multimedia streaming application launched on the mobile device 100. In this embodiment, the application server 106 is part of a core network 108, which is an IP Multimedia Services (IMS) network responsible for session control and Quality of Service (QoS) management of ongoing application sessions. Alternately, the application server 106 is located outside of the core network 108, whereby the core network 108 connects to the application server 106 via the Internet 110. In embodiments where the IMS core network 108 is not implemented, the application server 106 may be part of one of the access networks 102, 104, for example, or it may connect to the access networks 102, 104 via the Internet 110.

As illustrated in FIG. 1, the access networks 102, 104 interface with the mobile device 100 in accordance with a network interface specification 112. Preferably, the network interface specification 112 complies with one or more wireless access standards, each having corresponding data handling capabilities, such as average and maximum uplink/ downlink throughput speeds. In embodiments, the wireless network standards include CDMA 2000 1X, 1xEV-DO, 1xEV-DV, EDGE, and HSPDA network technologies, or combinations thereof In order to launch the application 106, the mobile device 100 typically accesses its home network 102. However, when the access network 102 is not available, such as when the mobile device 100 travels outside of its home coverage area, the mobile device 100 is capable of launching the application 106 via a roaming network 104.

Figure 2:
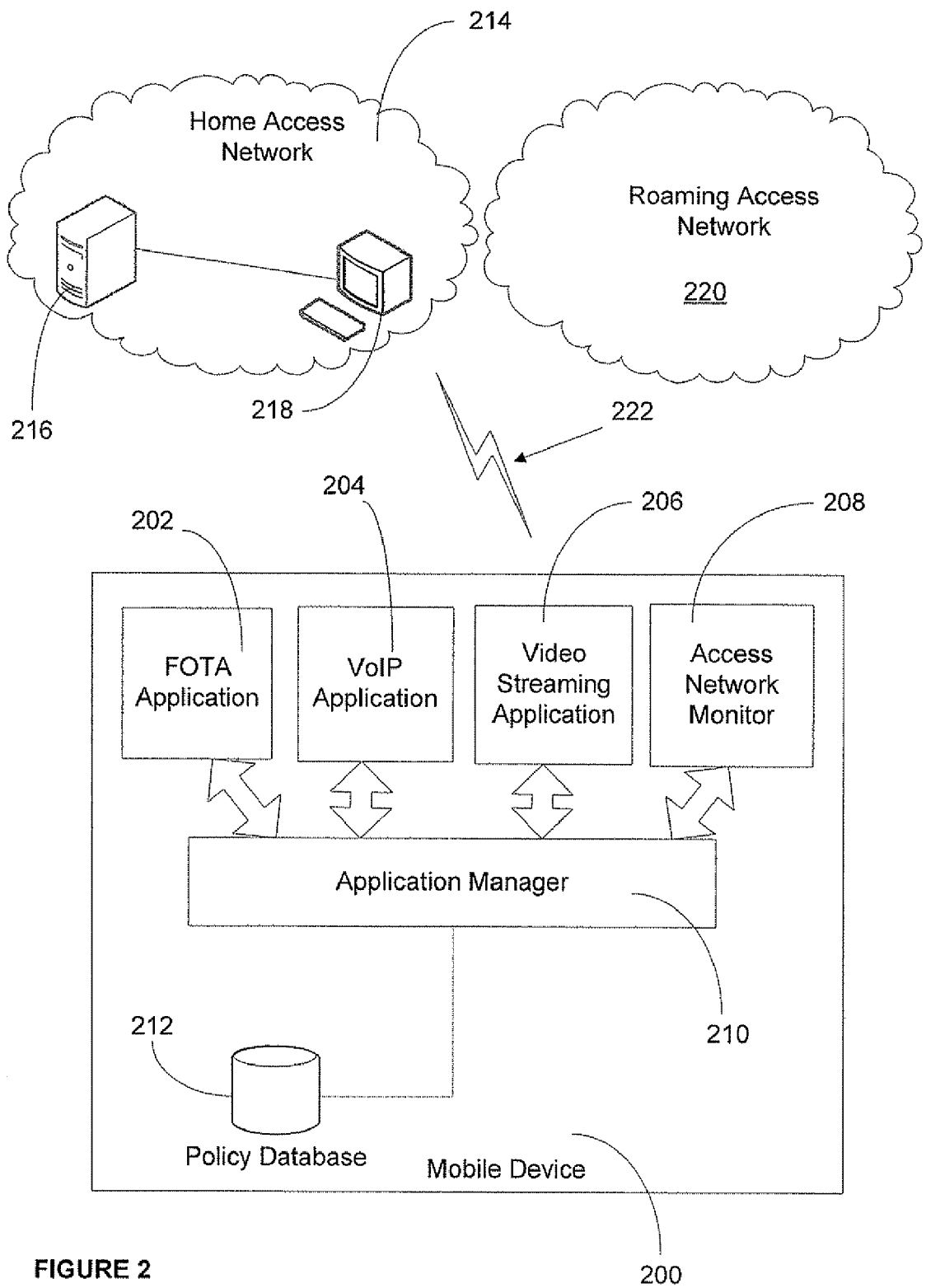
FIG. 2 is a schematic diagram of a system illustrating a particular embodiment of the system of FIG. 1, wherein a mobile device controls access to one or more applications based on access conditions associated with the current access network.

Turning to FIG. 2, embodiments of the mobile device 200 and networks 214, 220 are provided in accordance with an embodiment of the present invention, wherein the mobile device 200 controls access to one or more applications 202-206 based on access conditions associated with the access networks 214, 220. The mobile device 200 is capable of launching one or more applications 202-206 from its memory. The applications 202-206 include multimedia, voice, email, instant messaging, text messaging, firmware update, or any other applications or services requiring access to the home network 214 or roaming network 220 to establish an application session. In the illustrated embodiment, the memory of the mobile device 200 includes a Firmware Update Over the Air (FOTA) application 202, a Voice over IP (VoIP) application 204, and a video streaming application 206.

To prevent one or more applications or services 202-206 from running when the access conditions are not suitable, the memory of the mobile device 200 includes a policy or application access database 212, which is used to store a list of access conditions that are inappropriate for launching the applications 202-206. Specifically, the access conditions are based on the type of the current access network used by the mobile device 200 for launching or maintaining the requested application session 202-206. For example, the access conditions may indicate whether the mobile device is currently accessing its home network 214 or roaming on the network 220. Similarly, the access conditions may indicate the type of network access interface or standard used by the current network 214, 220 to provide data connection necessary to run the application 202-206. The following table illustrates an example of the policy database 212 having a list of applications and corresponding access conditions, which in this embodiment are designated as inappropriate for allowing access to the listed applications or services.

| Application | Access Conditions | Action |
|---|---|---|
| FOTA | Roaming | Suspend |
| FOTA | Home | Resume |
| Video streaming | CDMA 2000 1x | Deny access |
| VoIP | CDMA 2000 1x | Deny access |

Alternatively, the database 212 may contain a list of application/access condition pairs under which access to the requested applications or services is allowed. In embodiments, the policy database 212 includes application types, such as "video streaming" and/or associated application names, such as "Windows Media Player," for example. As illustrated above, the policy database 212 correlates predetermined actions with current status of access conditions associated with a given application session. When the mobile device 200 registers with an access network having a network access technology specification 222 with insufficient data handling capabilities for the requested application, the mobile device 200 is instructed to deny access to a data-intensive application or service specified in the database or lookup table 212. For example, the mobile device 200 is instructed to deny access to a video streaming or VoIP application session when the access conditions indicate that the mobile device 200 is currently using a CDMA 2000 1x network access technology. This avoids unnecessary use of network resources which, under current access conditions, are incapable of providing a satisfying user experience for the desired application. On the other hand, if the current access conditions do not match those in the policy database 212, such as when the mobile device 200 is registered with an EVDO access network, a user is granted full access to the desired video streaming or VoIP applications. Similarly, to avoid unwanted roaming charges, the policy database 212 includes instructions to suspend any scheduled firmware updates via a FOTA application until the mobile device 200 returns to the home network 214.

Preferably, the policy database 212 is populated by a network provider using conventional Over the Air Device Management (OTA DM) technology to provide the network operator with full control over the contents of the database 212. In an embodiment, the policy database 212 is centrally populated, distributed, and updated over the air for each mobile device 200 via a management console 218 connected to a device management server 216. The network provider may choose to distribute the policy database 212 according to different classes of mobile devices 200, wherein each device class designates the types of access networks accessible to the device 200, as well as the types of applications installed in its memory. The management console 218, as well as the device management server 216, are located within the home access network 214 or may be collocated with the network administration equipment at a network operations center (NOC) or at a mobile switching center (MSC), for example.

As further illustrated in FIG. 2, to gain access to the network resources, the application 202-206 registers with an application manager 210. Specifically, when a user attempts to launch an application 202-206, the application 202-206 supplies its name and/or type information to the application manager 210, which, in turn, receives an input of the monitored access conditions from the access network monitor 208. The application manager 210 queries the policy database 212 for the corresponding application/access condition entry and denies access to the application if a match is found. Otherwise, the mobile device 200 initiates the application session over the current access network 214, 220. In a further embodiment, the access network monitor 208 continues to report the changes in current access conditions during the application session to allow the application manager 210 to terminate the application when a change in the access conditions matches an entry in the policy database 212.

In this embodiment, the application manager 210 and the access network monitor 208 are implemented as Binary Runtime Environment for Wireless (BREW) software modules exposing standard interfaces for interaction with other software components of the mobile device 200 via an application programming interface (API). Other embodiments of the application manager 210 and access network monitor 208 include using a Java-based implementation capable of running on a plurality of mobile phone operating systems, such as Symbian, Windows Mobile Edition, or Palm, for example.

Figure 3:
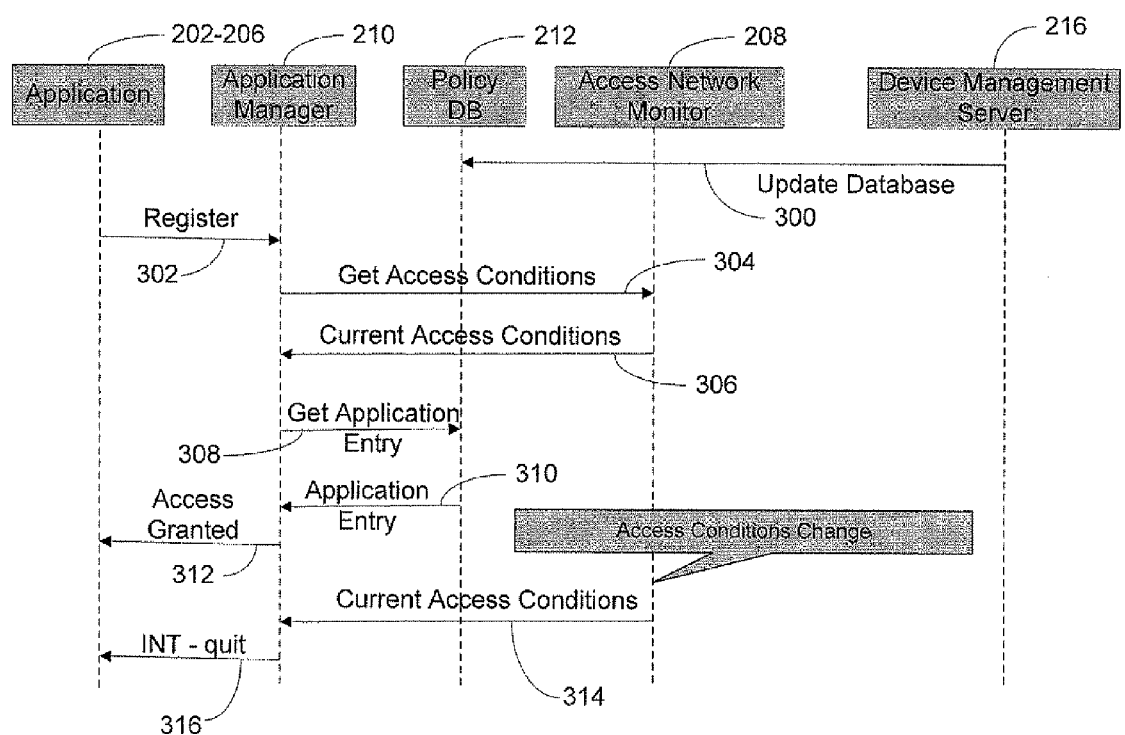
FIG. 3 is a message flow diagram illustrating a method for controlling access to applications from a mobile device of FIG. 2, in accordance with an embodiment of the invention.

Turning to FIG. 3, an embodiment of a method for controlling access to applications from a mobile device 200 is illustrated with reference to an exemplary message flow scenario. In step 300, the device management server 216 updates the policy database 212 when new applications or services are introduced by the network operator or pursuant to setting up a new customer account. In step 302, when the user requests to launch a video streaming application 206, the application 206 registers with the application manager 210 by providing it with its name and/or type information, such as "Windows Media Player"/"video streaming," for example. This prompts the application manager 210 to request and receive the current access condition information from the access network monitor 208, steps 304-306. In this embodiment, the access condition information includes information regarding the current access network, such as roaming status and compatible network access technology. In steps 308-310, based on the received application information, the application manager 210 requests and receives one or more entries from the policy database 212 indicating which access conditions preclude the establishment of an application session for the application 206. In step 312, the application manager allows the user to launch the requested application if the current access conditions do not match any of the entries returned by the policy database 212 that require denial or suspension of access to the application. In this embodiment, upon establishment of the application session, the access network monitor 208 continuously monitors any changes in the current access conditions. Therefore, when, in step 314, the access network monitor 208 detects a change in the access conditions, for example when the mobile device 200 migrates from an EVDO to a CDMA 2000 1X access network overlay, it notifies the application manager 210 accordingly. Since this change in the access conditions matches an entry received from the policy database 212 requiring denial of access to the application, the application manager 210, in step 316, sends an event to the application 206 ending the current application session by forcing it to quit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling access to an application, the application capable of running on a mobile device by connecting to an access network, the method comprising:
   registering the application with the mobile device;
   populating a record on the mobile device, the record specifying one or more conditions for controlling access to the application, the one or more conditions associated with the access network and comprising at least one condition to avoid roaming charges to a consumer, the at least one condition comprising an indicator whether the mobile device is roaming on another access network;
   monitoring the one or more conditions; and
   controlling access to the application from the mobile device based on the one or more conditions, wherein controlling access to the application further includes suspending application access until one or more conditions are not present;
   wherein the record is generated by a networked record provider and distributed to the mobile device based on a class of the mobile device, the class of the mobile device being designated according to: a type of access networks accessible to the mobile device, and a type of applications the mobile device is capable of running.

2. The method of claim 1 wherein the one or more conditions include an access network technology condition.

3. The method of claim 1 wherein the application is one of a multimedia application and a firmware update application.

4. The method of claim 1 wherein the access network is wireless.

5. The method of claim 1 further comprising launching the application if the one or more conditions are not present.

6. The method of claim 1 further comprising, in response to an occurrence of the one or more conditions, sending an event to the application, the event forcing the application to quit.

7. The method of claim 1 wherein the record is populated wirelessly.

8. A mobile device capable of running an application by connecting to an access network, the mobile device comprising:
  a processor;
  a wireless interface for connecting to the access network; and
  a computer readable medium having thereon instructions for:
  registering the application with the mobile device;
  populating a record on the mobile device, the record specifying one or more conditions for controlling access to the application, the one or more conditions associated with the access network and comprising at least one condition to avoid roaming charges to a consumer, the at least one condition comprising an indicator whether the mobile device is roaming on another access network;
  monitoring the one or more conditions; and
  controlling access to the application from the mobile device based on the one or more conditions, wherein controlling access to the application further includes suspending application access until one or more conditions are not present;
  wherein the record is generated by a networked record provider and distributed to the mobile device based on a class of the mobile device, the class of the mobile device being designated according to: a type of access networks accessible to the mobile device, and a type of applications the mobile device is capable of running.

9. The mobile device of claim 8 wherein the one or more conditions further comprise an access network technology condition.

10. The mobile device of claim 8 wherein the application is one of a multimedia application and a firmware update application.

11. The mobile device of claim 8 wherein the mobile device launches the application if the one or more conditions are not present.

12. The mobile device of claim 8 wherein, in response to an occurrence of the one or more conditions, the mobile device sends an event to the application, the event forcing the application to quit.

13. The mobile device of claim 8 wherein the record is populated wirelessly.

14. A system for controlling access to an application, the application capable of running on a mobile device by connecting to an access network, the system comprising:
  (a) the mobile device capable of storing a record for specifying one or more conditions for controlling access to the application, the one or more conditions associated with the access network and comprising at least one condition to avoid roaming charges to a consumer, the at least one condition comprising an indicator whether the mobile device is roaming on another access network, the mobile device comprising:
    an access network monitor module configured to monitor the one or more conditions; and
    an application manager module configured to control access to the application from the mobile device based on the one or more conditions reported by the access network monitor module, wherein the application manager module is further configured to control access to the application by suspending application access until one or more conditions are not present; and
  (b) a device management server having a management connection to the mobile device for populating the record, the device management server generating and distributing the record to the mobile device based on a class of the mobile device, the class of the mobile device being designated according to: a type of access networks accessible to the mobile device, and a type of applications the mobile device is capable of running.

15. The system of claim 14 wherein the management connection is wireless.

16. The system of claim 14 wherein the one or more conditions further comprise an access network technology condition.

17. The system of claim 14 wherein the application is one of a multimedia application and a firmware update application.

18. The system of claim 14 wherein the access network is wireless.

19. The system of claim 14 wherein the application manager module grants access to the application if the one or more conditions are not present.

20. The system of claim 14 wherein, in response to an occurrence of the one or more conditions, the application manager module sends an event to the application, the event forcing the application to quit.

* * * * *